(12) United States Patent
Yang et al.

(10) Patent No.: US 10,014,544 B2
(45) Date of Patent: Jul. 3, 2018

(54) REDOX FLOW BATTERY

(71) Applicant: KOREA INSTITUTE OF ENERGY RESEARCH, Daejeon (KR)

(72) Inventors: Junghoon Yang, Daejeon (KR); Jaedeok Jeon, Daejeon (KR); Joonmok Shim, Daejeon (KR); Kyounghee Shin, Daejeon (KR); Changsoo Jin, Daejeon (KR); Bumsuk Lee, Daejeon (KR); Myungseok Jeon, Daejeon (KR); Kyunam Jung, Daejeon (KR); Sunhwa Yeon, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 77 days.

(21) Appl. No.: 14/884,235

(22) Filed: Oct. 15, 2015

(65) Prior Publication Data
US 2016/0141697 A1    May 19, 2016

(30) Foreign Application Priority Data
Nov. 17, 2014   (KR) ................. 10-2014-0159812

(51) Int. Cl.
| | | |
|---|---|---|
| *H01M 8/18* | (2006.01) | |
| *H01M 8/04082* | (2016.01) | |
| *H01M 4/96* | (2006.01) | |
| *H01M 8/04276* | (2016.01) | |

(52) U.S. Cl.
CPC ....... *H01M 8/188* (2013.01); *H01M 8/04201* (2013.01); *H01M 4/96* (2013.01); *H01M 8/04276* (2013.01); *Y02E 60/528* (2013.01)

(58) Field of Classification Search
None
See application file for complete search history.

(56) References Cited

U.S. PATENT DOCUMENTS

| | | | |
|---|---|---|---|
| 2008/0081247 A1* | 4/2008 | Nakaishi | H01M 8/0273 429/72 |
| 2013/0164602 A1 | 6/2013 | Tsai et al. | |
| 2014/0248521 A1* | 9/2014 | Chiang | B60L 11/1879 429/105 |
| 2016/0079624 A1* | 3/2016 | Brantley | H01M 8/188 429/418 |

FOREIGN PATENT DOCUMENTS

| | | |
|---|---|---|
| EP | 2388853 A1 | 11/2011 |
| KR | 10-1394255 B1 | 5/2014 |

OTHER PUBLICATIONS

Oh, S.H., et al., "A metal-free and all-organic redox flow battery with polythiophene as the electroactive species," Journal of Materials Chemistry A, 2, Oct. 16, 2014, 19994-19998.*
Korean Notice of Allowance dated Sep. 28, 2016 in connection with the counterpart Korean Patent Application No. 10-2014-0159812.

* cited by examiner

*Primary Examiner* — Jonathan Crepeau
(74) *Attorney, Agent, or Firm* — Hauptman Ham, LLP

(57) ABSTRACT

The present invention relates to a redox flow battery, and is to provide a redox flow battery having high battery potential and high energy efficiency and providing a stable charge-discharge performance. The present invention provides a redox flow battery including: a stack arranged to separate a negative electrode unit and a positive electrode unit with respect to a separator; pumps configured to supply electrolytes including polythiophene to the stack; and tanks storing the polythiophene.

5 Claims, 8 Drawing Sheets

REDOX FLOW BATTERY

CROSS-REFERENCE TO RELATED APPLICATION

This application claims priority to and the benefit of Korean Patent Application No. 10-2014-0159812 filed in the Korean Intellectual Property Office on Nov. 17, 2014, the entire contents of which are incorporated herein by reference.

TECHNICAL FIELD

The present invention relates to a redox flow battery, and more particularly, to a metal-free and all-organic redox flow battery using polythiophene as an electroactive substance.

BACKGROUND

A study on electric energy has been a common interest throughout the world. Also, there is a rising interest on greenhouse gas emission recently. Accordingly, a solution is needed to reduce greenhouse gas emission and stably supply electric energy. As a solution to the described problem, high-capacity energy storage systems in which new-renewable energy and smart grid are integrated are suggested.

A redox flow battery of the above-described high-capacity energy storage systems is one of the most feasible technologies. As compared with other second batteries, such as a lithium-ion battery and a sodium-sulfur battery, the redox flow battery in a range of 10 KW to 10 MW is the most competitive in terms of costs, compatibility, quick response, stability, and the like. The redox flow battery is classified into two: an aqueous redox flow battery and an organic redox flow battery. The aqueous redox flow battery may have various forms to use all-vanadium (VRB), zinc-bromine (ZBB), iron-chromium (ICB), polysulfide-bromine (PSB), etc. as a redox pair. Among these, the VRB, the ZBB, the ICB, the PSB, and the like can supply hundreds of KW of electrical power and can be operated at several MW, so a study on commercialization has been conducted earlier.

However, a high price of an electrolyte, including transition metals used in the aqueous redox flow battery, has been a big problem of commercialization. Further, in theory, since an electrochemical potential of 1.229 V facilitates a process of electrolysis of water, there has been a problem of generating hydrogen and oxygen in a battery with a higher voltage difference than that. In practice, there is a problem of generating hydrogen in an anode at the time of operation of the ICB and the ZBB.

Due to the described problems, a study on the organic redox battery without a problem with electrolysis of water is being increased recently. Organic molecules may provide advantages of low costs, lightness in weight, and a lot of soluble substances. Besides, electrochemical properties of the organic molecules may be easily controlled using established organic chemical data. By using organic substances, redox flow batteries with extremely high energy density and power density may be manufactured. However, the organic redox flow battery has a limitation of low conductivity, and also has disadvantages of low current density, low power density, and the like at the same time.

SUMMARY

The present invention is directed to providing a metal-free all-organic redox flow battery with high current density and power density.

According to an aspect of the present invention, there is provided a redox flow battery of the present invention including a stack arranged so that a negative electrode unit and a positive electrode unit are separated with respect to a separator; pumps configured to supply electrolytes including polythiophene to the stack; and tanks configured to store the polythiophene.

The stack may include the negative electrode unit including a first end plate, a first collector, a first negative electrode plate, a first flow frame, a negative electrolyte inlet through which the negative electrolyte is introduced, and a negative electrolyte outlet through which the negative electrolyte is discharged; a membrane corresponding to the separator; and the positive electrode unit including a second end plate, a second collector, a first positive electrode plate, a second flow frame, a positive electrolyte inlet through which the positive electrolyte is introduced, and a positive electrolyte outlet through which the positive electrolyte is discharged.

The negative electrode unit may include a negative electrode and the negative electrolyte, and the positive electrode unit may include a positive electrode and the positive electrolyte.

At least one among the negative electrode and the positive electrode may be coated with carbon.

At least one among the negative electrode and the positive electrode may be a carbon felt electrode.

The pumps may include a first pump configured to supply an electrolyte in which n-doped polythiophene is diffused to the negative electrode unit; and a second pump configured to supply an electrolyte in which p-doped polythiophene is diffused to the positive electrode unit.

The tanks may include a first tank configured to store the electrolyte in which n-doped polythiophene is diffused; and a second tank configured to store the electrolyte in which p-doped polythiophene is diffused.

The tanks may store electrolytes including the polythiophene, Ketjenblack, and tetraethylammonium tetrafluoroborate and propylene carbonate solution.

As described above, according to an embodiment of the present invention, the redox flow battery of the present invention may provide a stable charge-discharge performance with high battery potential and high energy efficiency by using an electrolyte solution in which polythiophene microparticles are diffused as a redox pair.

DETAILED DESCRIPTION

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe in the best method he or she knows for carrying out the invention. Therefore, the configurations described in the embodiments and drawings of the present invention are merely most preferable embodiments but do not represent all of the technical spirit of the present invention. Thus, the present invention should be construed as including all the changes, equivalents, and substitutions included in the spirit and scope of the present invention at the time of filing this application.

Hereinafter, embodiments of the present invention will be described in detail with reference to the accompanying drawings. At this time, it is noted that like reference numerals denote like elements in appreciating the drawings. Moreover, detailed descriptions related to well-known functions or configurations will be omitted in order not to unnecessarily obscure the subject matter of the present invention. Based on the same reason, it is to be noted that some components shown in the drawings are exaggerated, omitted or schematically illustrated, and the size of each component does not exactly reflect its real size.

Figure 1:
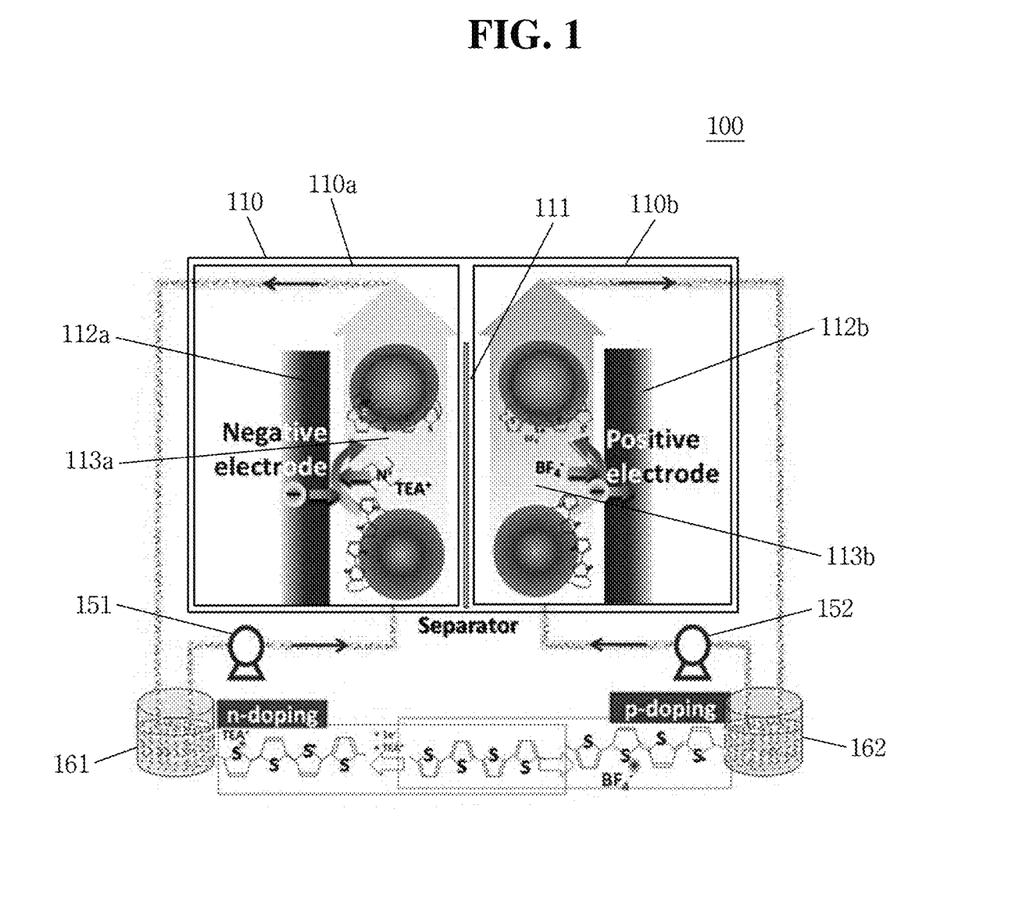
FIG. 1 is a view schematically illustrating a configuration of a redox flow battery according to an embodiment of the present invention.

FIG. 1 is a view schematically illustrating a configuration of a redox flow battery according to an embodiment of the present invention.

Referring to FIG. 1, the redox flow battery 100 of the present invention may include a stack 110, doping tanks 161 and 162, and pumps 151 and 152.

The redox flow battery 100 of the above-described configuration stores electrolytes in which polythiophene microparticles are diffused in the tanks 161 and 162 and supplies the electrolytes to the stack 110 using the pumps 151 and 152. Accordingly, the redox flow battery 100 may improve dependence on metal elements and provide high energy efficiency and stable charge-discharge performance by providing the polythiophene microparticles as active pairs of a negative electrolyte and a positive electrolyte.

The stack 110 may include a negative electrode unit 110*a* and a positive electrode unit 110*b* with respect to a separator 111. The negative electrode unit 110*a* may include a negative electrode 112*a* and a negative electrolyte 113*a*. The negative electrode 112*a* may be composed of a bipolar plate. The negative electrolyte 113*a* may be composed of an electrolyte including polythiophene microparticles. For example, the negative electrolyte 113*a* may be provided in a form in which the polythiophene microparticles are diffused in tetraethylammonium tetrafluoroborate and propylene carbonate solution.

The positive electrode unit 110*b* may include a positive electrode 112*b* and a positive electrolyte 113*b*. The positive electrode 112*b* may be composed of a bipolar plate like the negative electrode 112*a*. The positive electrolyte 113*b* may be composed of an electrolyte in which polythiophene microparticles are diffused like the negative electrolyte 113*a*. For example, the positive electrolyte 113*b* may be provided in a form in which the polythiophene microparticles are diffused in tetraethylammonium tetrafluoroborate and propylene carbonate solution.

The tanks 161 and 162 may include a negative electrode tank 161 and a positive electrode tank 162. The negative electrode tank 161 may store a solution in which polythiophene or n-doped polythiophene microparticles are diffused. For example, the negative electrode tank 161 may store polythiophene or n-doped polythiophene microparticles, Ketjenblack, and TEABF$_4$-PC solution. The positive electrode tank 162 may store a solution in which polythiophene or p-doped polythiophene microparticles are diffused. For example, the positive electrode tank 162 may store polythiophene or p-doped polythiophene microparticles, Ketjenblack, and TEABF$_4$-PC solution.

The above-described tanks 161 and 162 may be configured to include a plurality of sub-tanks storing electrolyte having a certain polarity. The tanks 161 and 162 may include a passage connected with the stack 110. The above-described pumps 151 and 152 may be arranged in the passage. The electrolytes having different polarities and stored in the tanks 161 and 162 may be transferred from each of the tanks 161 and 162 to the stack 110 according to control of the pumps 151 and 152. As described above, since the tanks 161 and 162 including the electrolytes having different polarities are arranged, the pumps 151 and 152 may be also assigned to the tanks 161 and 162, respectively.

The pumps 151 and 152 may include a first pump 151 pumping the electrolyte in which polythiophene microparticles are diffused to the negative electrode unit 110*a* of the stack 110, and a second pump 152 pumping the electrolyte in which polythiophene microparticles are diffused to the positive electrode unit 110*b* of the stack 110. Herein, the amount of electrolyte supplied to the stack 110 varies depending on a pumping operation of the pumps 151 and 152, and accordingly, the amount of power generated by reaction of electrolytes in the stack 110 varies. Therefore, the control of pumping operation of the pumps 151 and 152 may vary depending on the amount of power supplied to a load.

Additionally, the redox flow battery 100 of the present invention may be connected to a control module controlling a pumping speed of the pumps 151 and 152 and also connected to a load supplying power generated in the redox flow battery 100. The redox flow battery 100 may further include a cooling system to generate(cool?) [BY1]heat generated in processes of generation and supply of power.

The cooling system is configured to detect the temperatures of the tanks 161 and 162 and to control so that each of the tanks 161 and 162 has a predetermined temperature. A heat may be generated in a reaction process for generating power by moving the electrolytes stored in the tanks 161 and 162 to the stack 110, and the heat increases the temperatures of the tanks 161 and 162. Since a response characteristic is degraded due to the characteristics of an electrolyte when the temperature is increased, the cooling system may detect the temperatures of the tanks 161 and 162 and cool so that appropriate temperatures of the tanks 161 and 162 are maintained. To this end, the cooling system may perform control according to a sensor signal collected by a sensor detecting the temperatures of the tanks 161 and 162.

As described above, the redox flow battery 100 supplies the electrolytes stored in the tanks 161 and 162 to the stack 110 through the pumps 151 and 152. In the redox flow battery 100, the electrolytes transferred to the stack 110 make a predetermined reaction to generate power. The stack 110 is configured to make a chemical reaction by receiving the electrolytes with different polarities from the plurality of tanks 161 and 162, and to generate power in the process. The power provided from the stack 110 may be provided to operate the pumps 151 and 152 by being converted into a predetermined magnitude of direct current signal.

Figure 2:
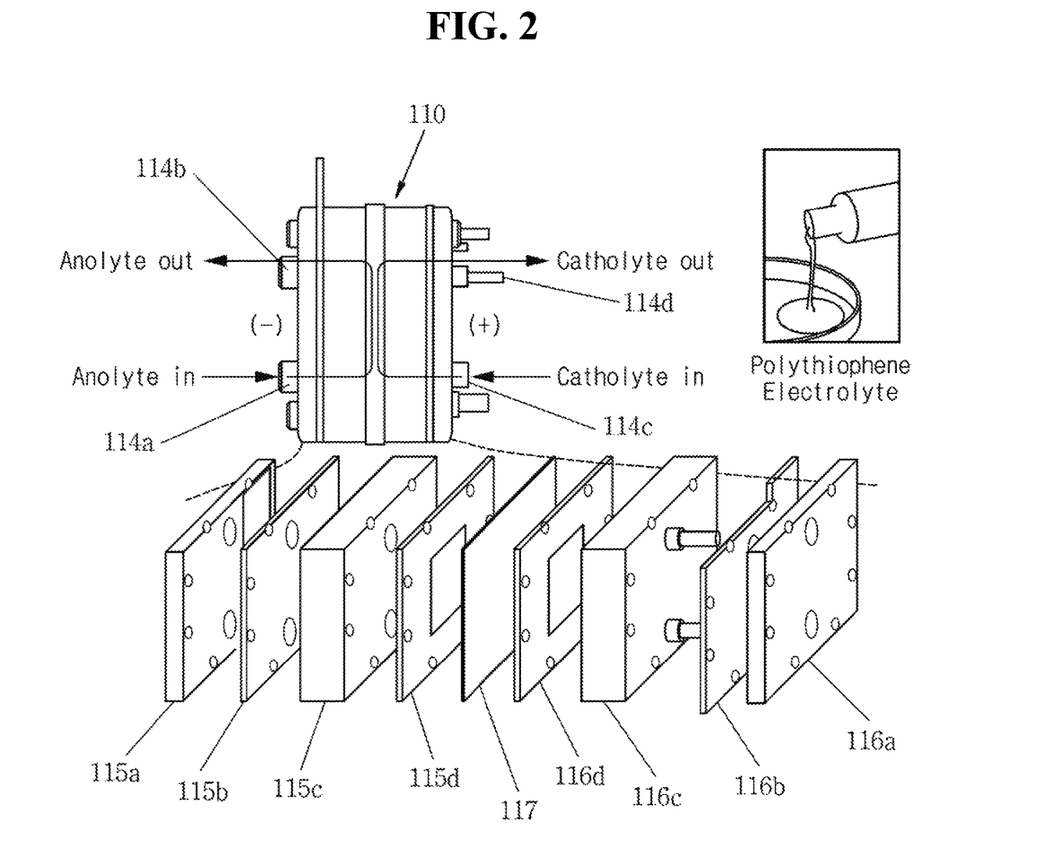
FIG. 2 is a view more specifically illustrating a configuration of an end cell of the redox flow battery according to the embodiment of the present invention.

FIG. 2 is a view more specifically illustrating a configuration of an end cell of the redox flow battery according to the embodiment of the present invention.

Referring to FIG. 2, as described above, the stack 110 may include the negative electrode unit 110a, the positive electrode unit 110b, and a membrane 117 (for example, anion-exchange membrane). Also, the negative electrode unit 110a may further include a negative electrolyte inlet 114a and a negative electrolyte outlet 114b. The positive electrode unit 110b may further include a positive electrolyte inlet 114c and a positive electrolyte outlet 114d. The membrane 117 (or frame and membrane) may function as the separator 111.

The negative electrode unit 110a may include a first end plate 115a, a first collector 115b, a first negative electrode plate 115c, and a first flow frame 115d (PTFE). The first end plate 115a surrounds an exterior of the negative electrode unit 110a and may include through holes in which the negative electrolyte inlet 114a and the negative electrolyte outlet 114b are arranged. The through holes may be formed in the first collector 115b and the first negative electrode plate 115c. The first collector 115b and the first negative electrode plate 115c function as the negative electrode 112a.

The positive electrode unit 110b may include a second end plate 116a, a second collector 116b, a first positive electrode plate 116c, and a second flow frame 116d (PTFE). The through holes in which the positive electrolyte inlet 114c and the positive electrolyte outlet 114d are arranged may be arranged in the second end plate 116a, the second collector 116b, and the first positive electrode plate 116c. The negative electrolyte and the positive electrolyte are introduced through the above-described passages, and then may make a chemical reaction with respect to the membrane 117. The second collector 116b and the first positive electrode plate 116c function as the positive electrode 112b.

As described above, the all-organic redox flow battery may be composed by using polythiophene microparticles as active pairs of a negative electrolyte and a positive electrolyte. The electrolyte may not include other metal materials. In the above described electrolyte, polythiophene 8.41 gL$^{-1}$ and Ketjenblack 2 gL$^{-1}$ are diffused in 1 M TEABF$_4$-PC solution. The mixed solution of 40 ml may be circulated through the flow battery. The concentration of polythiophene corresponds to 0.1 eqL$^{-1}$ with respect to monomer thiophene. To avoid a potential side reaction of polythiophene, a cut-off voltage of 3.0 V may be used.

Figure 3:
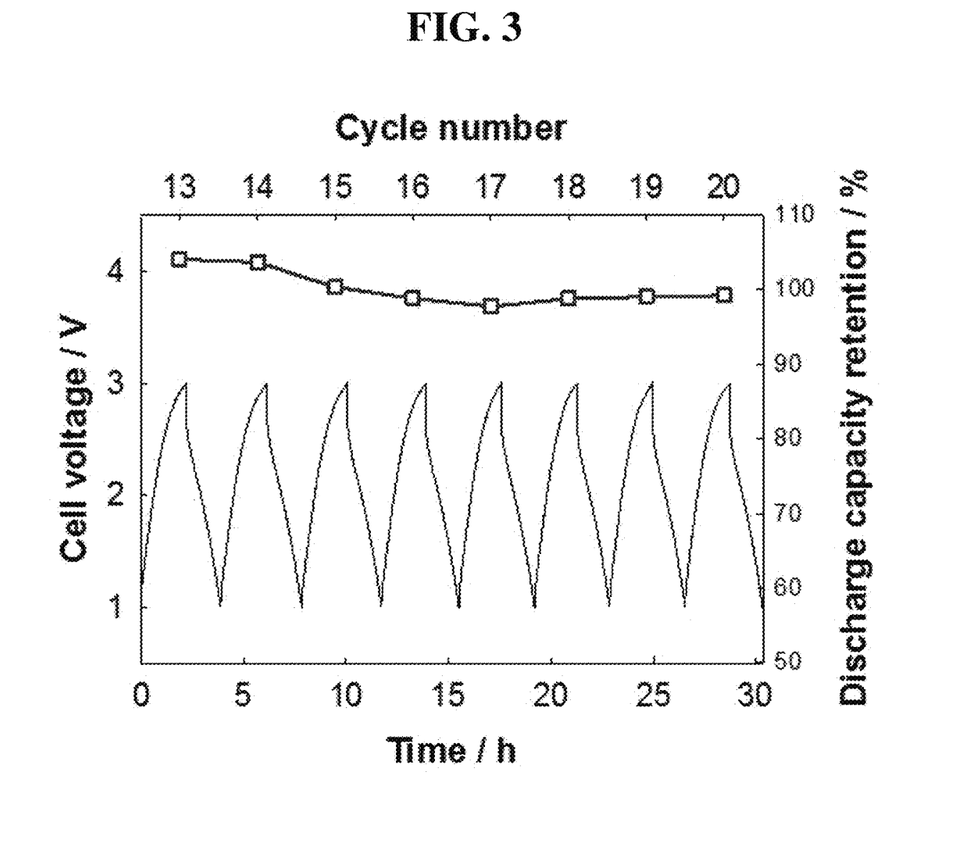
FIG. 3 is a view illustrating a charge-discharge profile of the redox flow battery according to the embodiment of the present invention.

FIG. 3 is a view illustrating a charge-discharge profile of the redox flow battery according to the embodiment of the present invention.

In FIG. 3, the charge-discharge profile of the redox flow battery uses polythiophene (0.1 eqL$^{-1}$ with respect to thiophene), Ketjenblack (2 gL$^{-1}$), TEABF$_4$ (1 molL$^{-1}$), propylene-carbonate (PC) solution in the positive electrode and the negative electrode, and represents information at an operation temperature of 25° C. and in a current density of 0.5 mA cm$^{-2}$. More specifically, the all-organic redox flow battery applied to FIG. 3 may be composed by using polythiophene microparticles as active pairs of a negative electrolyte and a positive electrolyte of electrolytes. The electrolyte may not include other metal materials. In the redox flow battery related to a confirmation of charge-discharge profile, a mixed solution 40 ml of polythiophene 8.41 gL$^{-1}$ and Ketjenblack 2 gL$^{-1}$ diffused in 1 M TEABF$_4$-PC solution may be circulated through the stack 110. The concentration of polythiophene corresponds to 0.1 eqL$^{-1}$ with respect to monomer thiophene. A cut-off voltage of 3.0 V may be applied to remove the potential side reaction of polythiophene.

Figure 4:
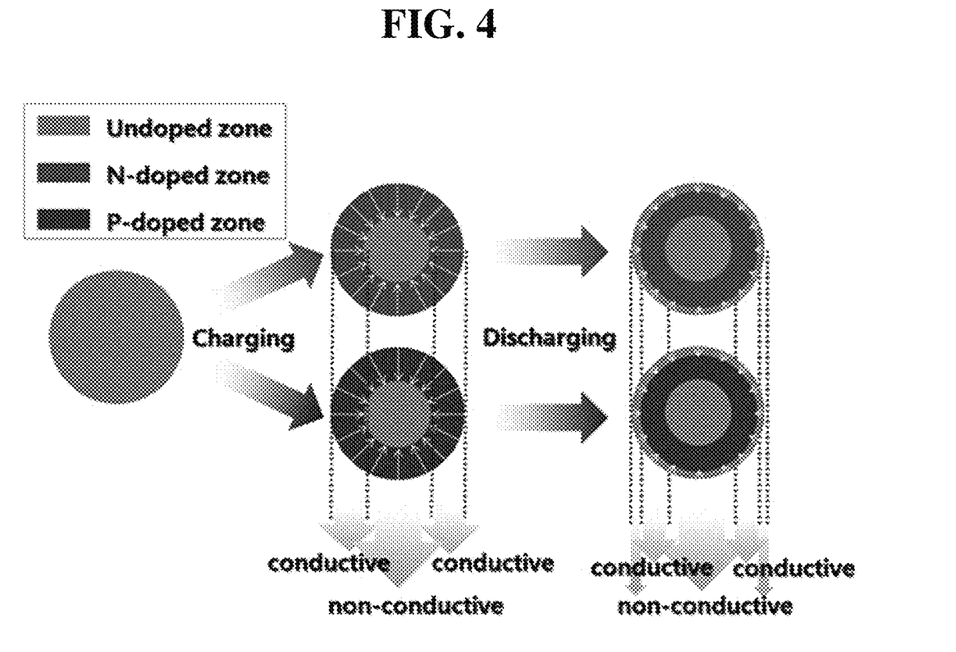
FIG. 4 is a schematic view of charge-discharge of polythiophene according to the embodiment of the present invention.
Figure 5:
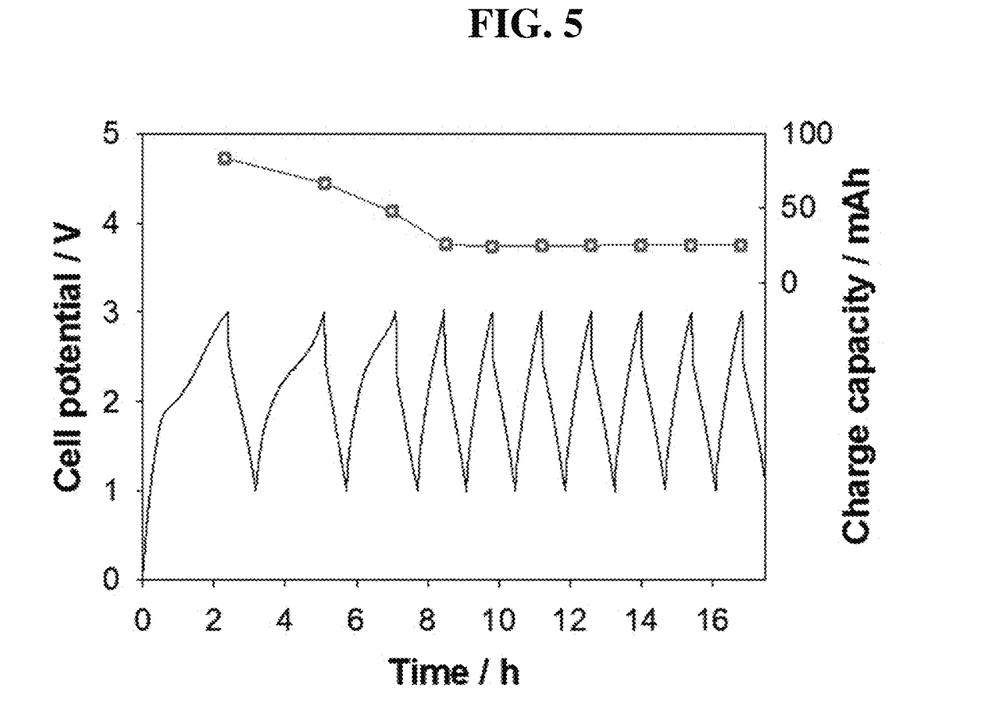
FIG. 5 is a view illustrating an initial charge-discharge profile of the redox flow battery according to the embodiment of the present invention.

FIG. 3 is a result measured in a current density of 0.5 mA cm$^{-2}$, and represents a charge-discharge performance of a battery using 34.5 percent of theoretical capacity. The low battery capacity compared to the theoretical capacity may be described by polythiophene conductivity. Conductive polymers, such as polythiophene, polypyrrole, or polyaniline, show low conductivity in a range of $10^{-10}$ to $10^{-5}$ Scm$^{-1}$ in a neutron state thereof. The above-described conductive polymers have a conductivity of 1-10$^4$ Scm$^{-1}$ through n-doping or p-doping and are converted into a semiconductor and a conductor. In the neutral polythiophene, a doping state is converted from the outside to the inside of particles during charge. The process allows a conductive shell helping an additional doping in the inside of particle to be generated. Therefore, most of polythiophene may be completely doped during an initial charge operation. On the other hand, in the doped polythiophene particles, a doped state is converted into a neutral state from the outside of polythiophene particles in a discharge process. The conversion allows a nonconductive shell (neutral polythiophene) to be formed on the outside of polythiophene particles, so that transferring of electrons into polythiophene particles is disturbed. That is, it results in that the inside of polythiophene is not used for discharge. [See FIG. 4] The characteristics may be a reason for quite low current efficiency during some first cycles. The charge capacities of first three cycles are 77.6%, 62.2%, and 44.3% of theoretical capacity. [See FIG. 5] Low capacity usability due to a nonconductive shell may be improved by using nanoscale polythiophene particles instead of microscale polythiophene particles. As shown in FIG. 3, the discharge capacity retention represents respective complete cycles. A current discharge capacity retention (discharge capacity ratio of a current cycle to a previous cycle), like in FIG. 3, is as high as 100.2±2.4% in a current density of 0.5 mA cm$^{-2}$.

Figure 6:
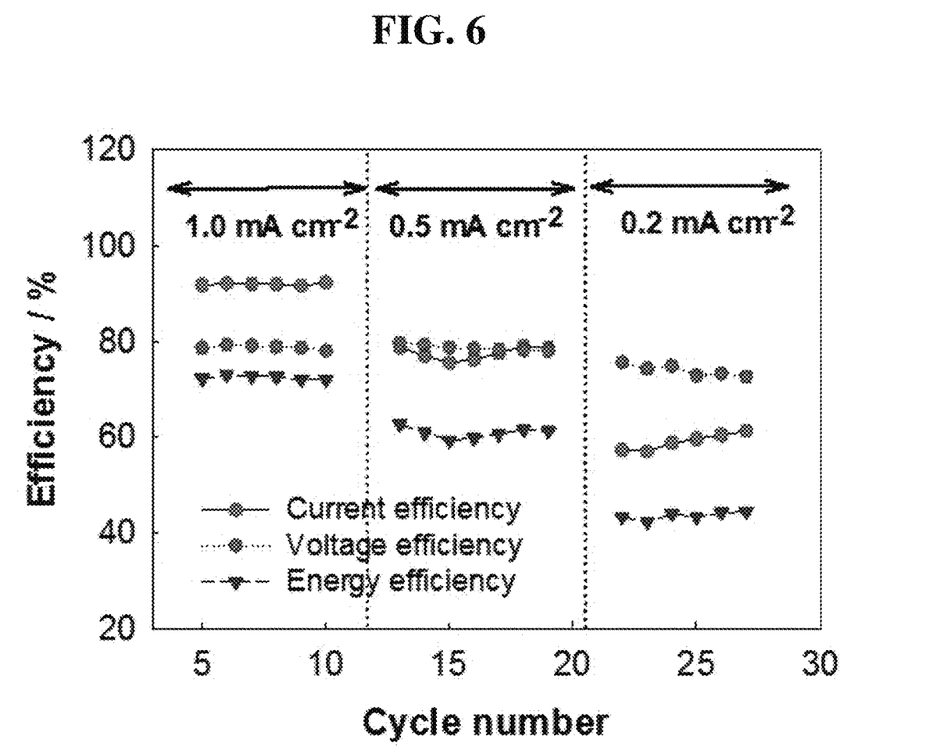
FIG. 6 is a view illustrating current, voltage, and energy efficiency of the redox flow battery according to the embodiment of the present invention.

FIG. 6 is a view illustrating current, voltage, and energy efficiency of the redox flow battery according to the embodiment of the present invention. The current efficiency, voltage efficiency, and energy efficiency are 77.5±1.3%, 78.6±0.6%, 60.9±1.1%. Although a carbon felt electrode is not used, the voltage efficiency, as shown in FIG. 6, is represented 75% or higher in current densities of 0.2 mA cm$^{-2}$, 0.5 mA cm$^{-2}$, and 1.0 mA cm$^{-2}$. The characteristics are described by an electrical connection between conductive polythiophene particles and Ketjenblack during electrolyte circulation.

The battery characteristic of the described result may be improved by controlling the size of polythiophene particle, conductivity, and a material such as an additive. The battery of the described characteristic may be optimized by process changes (a battery design, an operation condition, and the like). Additionally, the redox flow battery 100 of the present invention may increase an energy density of battery by improving diffusion of polythiophene particles by applying a concentration of more than 2.0 eqL$^{-1}$ with respect to monomer thiophene. Also, since the same initial electrolyte composition is applied to both of the negative electrolyte and the positive electrolyte, an initial electrolyte state may be recovered by simply remixing the positive and negative electrolytes when the capacity degradation of electrolyte is generated.

As described above, the organic redox flow battery of the present invention may use polythiophene as a redox pair. The polythiophene is one among π-aromatic and redox active organic molecules. The polythiophene may be n-doped and p-doped. The polythiophene allows one additional electron per thiophene-repeat unit to be arranged at a negative potential of less than or equal to −2.0 V compared to Ag/Ag$^+$. The polythiophene also loses one electron per repeat unit at a positive potential of greater than or equal to +0.5 V compared to Ag/Ag$^+$. Based on theoretical calculation, the above-described characteristics may provide high capacity of 319 mAhg$^{-1}$, nearly twice as much as LiCoO$_2$ of a lithium-ion battery. The polythiophene may improve low conductivity of the organic redox flow battery using conductive particles (or conductive balls) diffused in an organic electrolyte.

The electrochemical characteristics of polythiophene may be researched using a cyclic voltammetry (CV) and an electrochemical impedance analysis method. In the polythiophene prepared by two methods different from each other, such as an electrochemical method and chemical polymerization, electrochemical characteristics may be compared. In using chemically fused polythiophene particles, stability and performance as a redox pair in the flow battery may be confirmed by a charge-discharge test.

Figure 7:
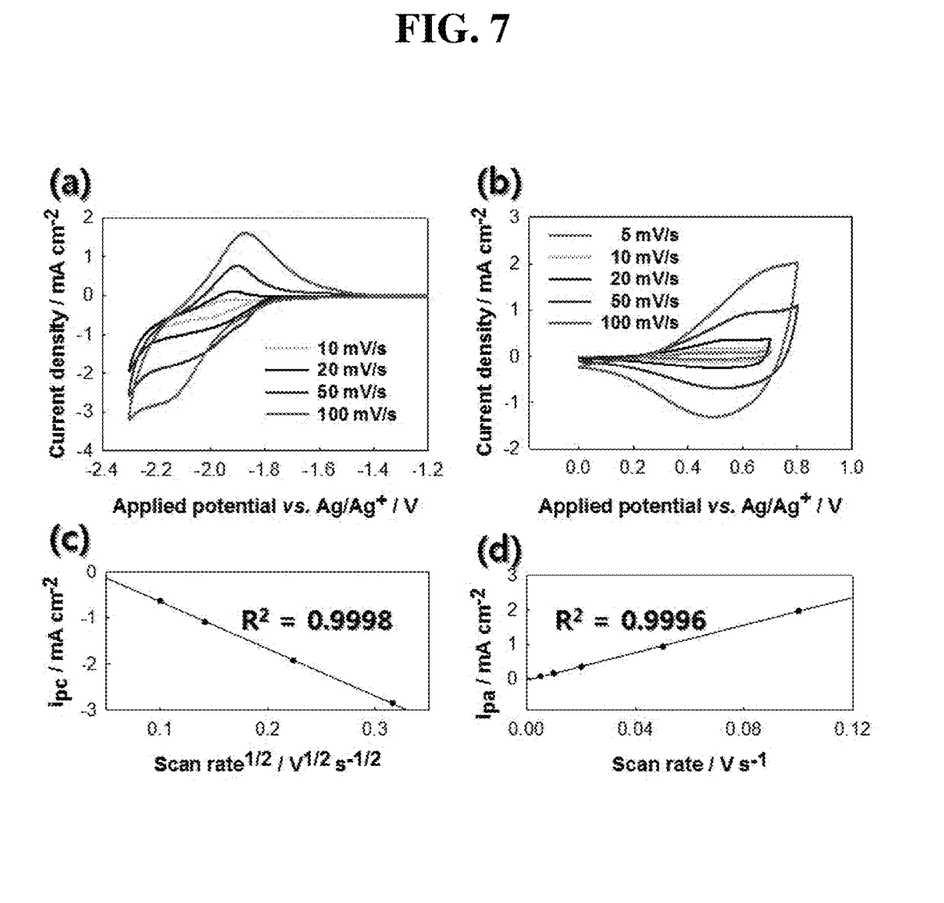
FIG. 7 is views illustrating cyclic voltage curves for the polythiophene used in the present invention at various scan rates.

FIG. 7 is views illustrating cyclic voltage curves for the redox flow battery of the present invention at various voltage scan rates. Herein, to research an n-doping characteristic of the electrochemically synthesized polythiophene, a circulation potential of between −1.2 to −2.3 V may be applied to polythiophene coated on a carbon electrode.

(a) of FIG. 7 shows a cyclic voltage curve of n-doped polythiophene. The peak current density of the n-doped polythiophene is observed in a potential range of between −2.2 to −2.0 V. (b) of FIG. 7 shows a cyclic voltage curve of p-doped polythiophene.

(c) of FIG. 7 shows a level of dependence on a voltage scan rate of reduction peak current density in an n-doping treatment environment. Although the polythiophene is arranged on an electrode surface, the reduction peak current density is linearly increased according to 0.5 squared of scan rate. Since n-doping or p-doping of polythiophene results in combination of counter ions into a polymer network, when comparatively large ions are diffused in the network, the diffusion rate may determine an entire redox reaction rate. For example, the ion sizes of tetraethylammonium cations (TEA$^+$, 0.67 nm) and tetrafluoroborate anions (BF$_4^-$, 0.48 nm) are considerably larger than that of general supporting electrolytes (e.g. Li$^+$: 0.18 nm). In the embodiment, since the TEABF$_4$ is used as a supporting electrolyte, the redox reaction rate may be determined by a diffusion rate of TEA$^+$.

(d) of FIG. 7 shows a level of dependence on a voltage scan rate of oxidation peak current density in a p-doping treatment environment. A p-doping redox reaction may occur in a large range of 0.2 to 0.8 V. In this case, the oxidation peak current density corresponds to a general aspect of an electrodeposited electric active layer, and is linearly increased according to a scan rate. Herein, since the comparatively small BF4$^-$ is more easily diffused to a polythiophene network, the entire redox reaction rate may be determined by load transfer characteristics between an electrode and a polythiophene layer.

Figure 8:
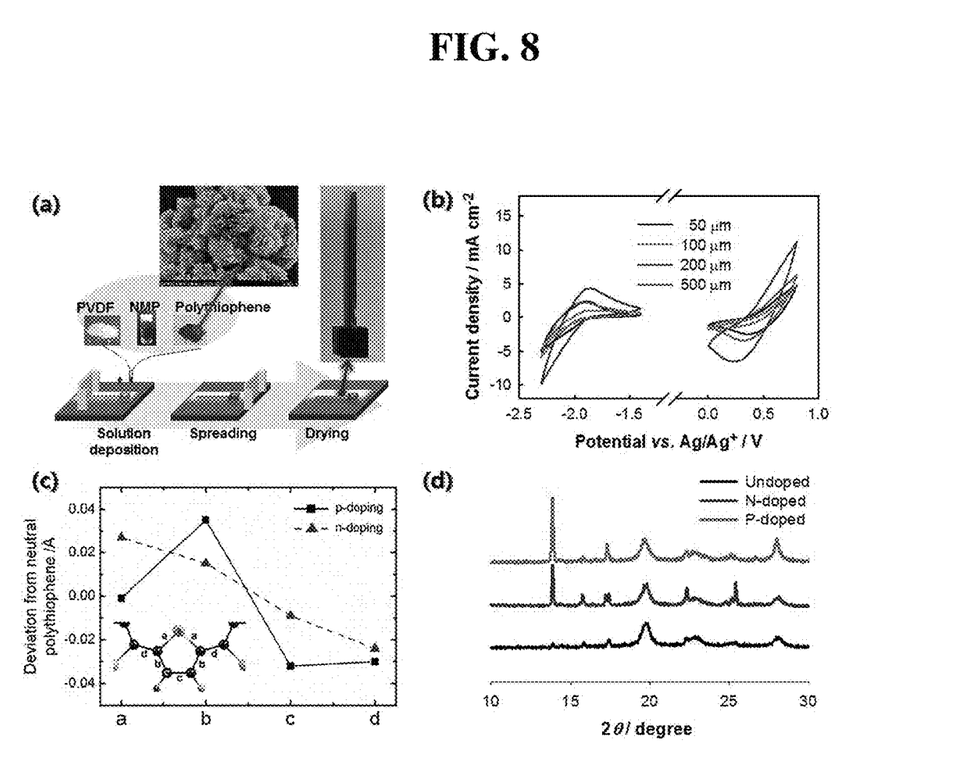
FIG. 8 is a comparative view of electrochemically synthesized polythiophene and chemically synthesized polythiophene with respect to the redox flow battery of the present invention.

FIG. 8 is a comparative view of electrochemically synthesized polythiophene and chemically synthesized polythiophene with respect to the redox flow battery of the present invention.

For comparison, like in (a) of FIG. 8, a chemically synthesized polythiophene particle thin film may be generated on a titanium electrode. (b) of FIG. 8 shows CV analysis of polythiophene particle layers with different thicknesses. As comparing CVs of the electrochemically synthesized polythiophene, due to a contact resistance between the polythiophene particles and a titanium electrode surface, it is observed that an overpotential is high and a peak current is further blurred. Current densities of n-doped and p-doped things are increased according to increase in thickness. However, in a thickness of more than or equal to 500 um, a current is remarkably reduced.

Meanwhile, the chemically synthesized polythiophene shows a small structural change before and after doping treatment. To test electron redistribution caused by n-doping or p-doping, and a structural change corresponding thereto, the structures of polythiophene may be calculated using a density functional theory (DFT).

Referring to (c) of FIG. 8, structural changes of n-doped polythiophene and p-doped polythiophene are small. The maximum change in a bond distance is about 0.04 (2.9%) with respect to neutral polythiophene. More specifically, in the case of the n-doped polythiophene, bond extension in S—C (bond a in the inserted drawing of FIG. 8), C—C (bond b in the inserted drawing), bond contraction in C—C (bond c in the inserted drawing), and decrease in a distance between loops (d in the inserted drawing), etc. are shown. Similar tendency is observed in the case of p-doped polythiophene except a slight change in a bond distance at b, c, and d. There is no change in a bond distance at a, and the p-doped polythiophene has larger amplitudes of bond distance changes at b, c, and d than the n-doped polythiophene. Also, bond angles have a similar tendency to bond distances. Despite of doping, an angle deviation of a carbon ring is below 1°. (the maximum change: −0.99°)

(d) of FIG. 8 shows an XRD pattern of 200 um film in which polythiophene particles are casted before or after doping. In the XRD (X-ray diffraction) pattern, a large change in n-doped polythiophene or p-doped polythiophene structure is not observed except a strong peak at 2θ=13.8°. The peak corresponds to a distance of 6.4 between diffraction regions. When the polythiophene is n-doped or p-doped, a polymer chain may be rearranged by a charge repulsive power between thiophene repeat units and may generate several crystal structures. Therefore, it may be assumed that the polythiophene is stable in a redox treating process.

As described above, the redox flow battery of the present invention uses polythiophene microparticles as redox pairs of a negative electrode and a positive electrode. The polythiophene shows electrochemical redox activity (n-doped or p-doped) at −2.0 V, +0.5 V compared to Ag/Ag$^+$. Therefore, the redox flow battery of the present invention may be operated at a battery potential of 2.5 V. Herein, the redox flow battery having an electrolyte having polythiophene microparticles diffused in 1 M TEABF$_4$-PC solution may be operated. The above-described redox flow battery shows stable charge-discharge performance corresponding to high energy efficiency of 60.9% at a current density of 0.5 mA cm$^{-1}$. If solution replacement is required in the redox flow battery, a half-cell battery electrolyte may be remixed to be recovered to an initial electrolyte state. The polythiophene microparticles described above with respect to electric conductivity improvement may be replaced with polythiophene nanoparticles.

In this specification, exemplary embodiments of the present invention have been classified into the first, second and third exemplary embodiments and described for conciseness. However, respective steps or functions of an exemplary embodiment may be combined with those of another exemplary embodiment to implement still another exemplary embodiment of the present invention.

What is claimed is:

1. A redox flow battery, comprising:
   a stack arranged so that a negative electrode unit and a positive electrode unit are separated with respect to a separator, wherein
   the negative electrode unit comprises a negative electrode and negative electrolyte, and
   the positive electrode unit comprises a positive electrode and positive electrolyte;
   a first tank containing the negative electrolyte;
   a second tank containing the positive electrolyte;
   a first pump arranged between the negative electrode unit and the first tank, and configured to supply the negative electrolyte in the first tank to the negative electrode unit; and
   a second pump arranged between the positive electrode unit and the second tank, and configured to supply the positive electrolyte in the second tank to the positive electrode unit,
   wherein n-doped polythiophene is diffused in the negative electrolyte and p-doped polythiophene is diffused in the positive electrolyte.

2. The redox flow battery of claim 1, wherein
   the negative electrode unit comprises
   the negative electrode having a first end plate, a first collector, a first negative electrode plate, and a first flow frame,
   a negative electrolyte inlet connected with the first pump so that the negative electrolyte is introduced, and
   a negative electrolyte outlet connected with the first tank so that the negative electrolyte is discharged,
   the separator is a membrane, and
   the positive electrode unit comprises a second end plate, a second collector, a first positive electrode plate and a second flow frame,
   a positive electrolyte inlet connected with the second pump so that the positive electrolyte is introduced, and
   a positive electrolyte outlet connected with the second tank so that the positive electrolyte is discharged.

3. The redox flow battery of claim 1, wherein at least one among the negative electrode and the positive electrode is coated with carbon.

4. The redox flow battery of claim 1, wherein at least one among the negative electrode and the positive electrode is a carbon felt electrode.

5. The redox flow battery of claim 1, wherein
   the negative electrolyte comprising the n-doped polythiophene, Ketjenblack, tetraethylammonium tetrafluoroborate and propylene carbonate solution, and
   the positive electrolyte comprising the p-doped polythiophene, Ketjenblack, tetraethylammonium tetrafluoroborate and propylene carbonate solution.

* * * * *